US012579300B2

(12) United States Patent
Ibtehaz et al.

(10) Patent No.: US 12,579,300 B2
(45) Date of Patent: Mar. 17, 2026

(54) ELECTRONIC APPARATUS AND CONTROL METHOD THEREFOR

(71) Applicant: SAMSUNG ELECTRONICS CO., LTD., Suwon-si (KR)

(72) Inventors: Nabil Ibtehaz, Dacca (BD); Dibyendu Das, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/116,130

(22) Filed: Mar. 1, 2023

(65) Prior Publication Data

US 2023/0205923 A1     Jun. 29, 2023

Related U.S. Application Data

(63) Continuation of application No. PCT/KR2021/008907, filed on Jul. 12, 2021.

(30) Foreign Application Priority Data

Sep. 1, 2020     (KR) ........................ 10-2020-0111245

(51) Int. Cl.
*G06F 21/62* (2013.01)
*G06F 3/04842* (2022.01)
(Continued)

(52) U.S. Cl.
CPC ...... *G06F 21/6245* (2013.01); *G06F 3/04842* (2013.01); *G06F 3/04845* (2013.01);
(Continued)

(58) Field of Classification Search
CPC ............ G06F 21/6245; G06F 3/04842; G06F 3/04845; G06F 3/0488; G06F 3/14;
(Continued)

(56) References Cited

U.S. PATENT DOCUMENTS

| | | | |
|---|---|---|---|
| 6,959,099 B2 | 10/2005 | Gutta et al. | |
| 8,098,904 B2 | 1/2012 | Ioffe et al. | |

(Continued)

FOREIGN PATENT DOCUMENTS

| | | |
|---|---|---|
| CN | 1237485 C | 1/2006 |
| EP | 3617921 A1 | 3/2020 |

(Continued)

OTHER PUBLICATIONS

A. Hutchinson et al., "Court Rules that LinkedIn Cannot Stop Third Party Data Scraping of Public Information", SocialMediaToday, Sep. 10, 2019, (3 pages total).

(Continued)

*Primary Examiner* — Linglan Edwards
*Assistant Examiner* — Jacob Benedict Knackstedt
(74) *Attorney, Agent, or Firm* — Sughrue Mion, PLLC

(57) ABSTRACT

Disclosed is an electronic apparatus. The electronic apparatus may comprise: a memory storing an application and a neural network model; a display; and a processor which, by executing the application, differentiates an input image into a plurality of patches, obtains information about a privacy object included in the input image by inputting the plurality of patches to the neural network model, obtains an output image including a guide GUI for guiding the privacy object based on the obtained information, and controls the display to display the obtained output image.

17 Claims, 20 Drawing Sheets

(51) Int. Cl.

| | |
|---|---|
| *G06F 3/04845* | (2022.01) |
| *G06F 3/0488* | (2022.01) |
| *G06F 3/14* | (2006.01) |
| *G06T 5/20* | (2006.01) |
| *G06T 5/70* | (2024.01) |
| *G06T 7/11* | (2017.01) |
| *G06V 10/82* | (2022.01) |

(52) U.S. Cl.
CPC .............. *G06F 3/0488* (2013.01); *G06F 3/14* (2013.01); *G06T 5/20* (2013.01); *G06T 5/70* (2024.01); *G06T 7/11* (2017.01); *G06V 10/82* (2022.01); *G06T 2207/20104* (2013.01); *G06V 2201/07* (2022.01)

(58) Field of Classification Search
CPC ..... G06T 7/11; G06T 5/70; G06T 5/20; G06T 2207/20104; G06V 10/82; G06V 2201/07
See application file for complete search history.

(56) References Cited

U.S. PATENT DOCUMENTS

| | | | |
|---|---|---|---|
| 9,350,914 | B1 | 5/2016 | Kaur et al. |
| 10,467,479 | B2 | 11/2019 | Kawano |
| 10,623,631 | B2 | 4/2020 | Takayama |
| 2013/0108105 | A1* | 5/2013 | Yoo ......................... H04N 5/275 |
| | | | 382/103 |
| 2016/0171332 | A1 | 6/2016 | Kawano |
| 2016/0196675 | A1 | 7/2016 | Kosmach et al. |
| 2017/0061562 | A1* | 3/2017 | Kim ........................ G06T 1/005 |
| 2018/0189504 | A1 | 7/2018 | Ghafourifar et al. |
| 2018/0189505 | A1* | 7/2018 | Ghafourifar ........ G06F 21/6209 |
| 2018/0365809 | A1 | 12/2018 | Cutler et al. |
| 2019/0349517 | A1 | 11/2019 | Kim |
| 2020/0034631 | A1 | 1/2020 | Kawano |
| 2020/0250341 | A1 | 8/2020 | Yim et al. |
| 2021/0042950 | A1* | 2/2021 | Wantland .............. G06T 19/006 |

| | | | | |
|---|---|---|---|---|
| 2021/0312599 | A1* | 10/2021 | Amirghodsi | .............. G06T 7/90 |
| 2022/0139073 | A1* | 5/2022 | Kim | ....................... G06V 10/82 |
| | | | | 382/155 |
| 2024/0135677 | A1* | 4/2024 | Chen | .................... G06V 10/764 |

FOREIGN PATENT DOCUMENTS

| | | | |
|---|---|---|---|
| JP | 2009-81635 | A | 4/2009 |
| KR | 10-2013-0047223 | A | 5/2013 |
| KR | 10-2016-0011302 | A | 2/2016 |
| KR | 10-2016-0073330 | A | 6/2016 |
| KR | 10-2018-0080081 | A | 7/2018 |
| KR | 10-2019-0129697 | A | 11/2019 |
| KR | 10-2100582 | B1 | 4/2020 |

OTHER PUBLICATIONS

O. Mattison, "10 Best Free Apps for Blurring Faces in Photos and Videos [iPhone and Android]", Wondershare, https://filmora. wondershare.com/video-editor/best-blur-faces-apps.html, Nov. 14, 2022 (9 pages total).

I. Goodfellow et al., "Explaining and Harnessing Adversarial Examples", Google Inc., arXiv:1412.6572v1 [stat.ML], Dec. 20, 2014, (10 pages total).

L. Chen et al., "Intelligent image synthesis to attack a segmentation CNN using adversarial learning", arXiv:1909.11167v1 [eess.IV], Sep. 24, 2019, (10 pages total).

"Why phone makers are obsessed with cameras", Scoop Independent News, https://www.scoop.co.nz/stories/HL1803/S00067/why-phone-makers-are-obsessed-with-cameras.htm, Mar. 11, 2018, (3 pages total).

International Search Report (PCT/ISA/210) dated Sep. 29, 2021 issued by the International Searching Authority in International Application No. PCT/KR2021008907.

Written Opinion (PCT/ISA/237) dated Sep. 29, 2021 issued by the International Searching Authority in International Application No. PCT/KR2021008907.

Communication dated Feb. 7, 2026 issued by the Korean Patent Office in Application No. 10-2020-0111245.

* cited by examiner

INPUT IMAGE

DETECT FACE

DISPLAY PRIVACY OBJECT

REPLACE WITH EMOJI OR IMAGE

CONVERT PIXEL TO BLACK PIXEL

BLURRED USING GAUSSIAN FILTER

INPUT IMAGE

NON-OVERLAPPING PATCH

900

30

ELECTRONIC APPARATUS AND CONTROL METHOD THEREFOR

CROSS-REFERENCE TO RELATED APPLICATIONS

This application is a by-pass continuation of International Application No. PCT/KR2021/008907, filed on Jul. 12, 2021, which is based on and claims priority to Korean Patent Application No. 10-2020-0111245, filed on Sep. 1, 2020, in the Korean Intellectual Property Office, the disclosures of which are incorporated herein by reference in their entirety.

BACKGROUND

1. Field

The present disclosure relates to an electronic apparatus which may process and provide an object that is included in a photo or an image, and a control method therefor.

2. Description of Related Art

A conventional electronic apparatus may take a photo or an image, and upload the same to a social network service (SNS) or transmit the same to another electronic apparatus. As a result, privacy infringement may occur when an unwanted object is included in the photo or image.

SUMMARY

The present disclosure provides an electronic apparatus for protecting a privacy object included in a photo or image by using a neural network model, and a control method therefor.

According to an embodiment of the present disclosure, an electronic apparatus includes: a memory storing an application; a display; and a processor executing the application to differentiate an input image into a plurality of patches, obtaining information on a privacy object included in the input image by inputting the plurality of patches into a neural network model, obtaining an output image including a guide graphical user interface (GUI) for guiding the privacy object based on the obtained information, and controlling the display to display the obtained output image.

Here, the processor may control the display to display the output image on which processing for protecting a selected privacy object is performed when the privacy object is selected through the guide GUI.

Here, the processor may control the display to display the output image including information on the guide GUI for guiding the privacy object and a plurality of processing methods for protecting the privacy object, and control the display to display the selected privacy object processed by a selected processing method when the privacy object is selected through the guide GUI and one of the plurality of processing methods is selected.

In addition, the processor may perform at least one of blur processing, single-color processing, or emoji processing on the selected privacy object.

Meanwhile, the processor may identify a region selected by touch input through a stylus pen as a region including the selected privacy object, perform the processing for protecting the selected privacy object in the identified region, and control the display to display the output image including the region in which the processing is performed.

Meanwhile, the processor may differentiate a first frame included in the input image into a plurality of first patches, and input the plurality of first patches to the neural network model, thereby obtaining the information on the privacy object included in the first frame, and track the privacy object identified in a frame after the first frame and identify the privacy object in the frame after the first frame when identifying the privacy object in the first frame based on the information on the privacy object.

In addition, the processor may differentiate the input image into a plurality of overlapping patches in which at least some regions overlap each other, and input the plurality of overlapping patches to the neural network model, thereby obtaining the information on the privacy object included in the input image.

Meanwhile, the processor may filter the output image by applying a preset image filter to the output image, and control the display to display the filtered image.

Here, the preset image filter may include at least one of an adversarial noise filter or a watermark filter for another neural network model.

Here, the processor may control the display to display a user interface (UI) for selecting at least one of the adversarial noise filter or the watermark filter, and control the display to display the output image to which the image filter selected through the UI is applied.

According to another embodiment of the present disclosure, a controlling method for an electronic apparatus includes: differentiating an input image into a plurality of patches when a privacy protection mode for the input image is executed; obtaining information on a privacy object included in the input image by inputting the plurality of patches to a neural network model; obtaining an output image including a guide graphical user interface (GUI) for guiding the privacy object based on the obtained information; and displaying the obtained output image.

Here, in the displaying of the obtained output image, processing for protecting a selected privacy object may be performed, and the processed output image may be displayed, when the privacy object is selected through the guide GUI.

Here, the method may further include displaying information on a plurality of processing methods for protecting the selected privacy object, wherein in the displaying of the obtained output image, the selected privacy object may be displayed by being processed by a selected processing method when the privacy object is selected through the guide GUI and one of the plurality of processing methods is selected.

In addition, in the displaying of the obtained output image, at least one of blur processing, single-color processing, or emoji processing on the selected privacy object may be performed.

Meanwhile, the method may further include identifying a region selected by touch input through a stylus pen as a region including the selected privacy object, wherein in the displaying of the obtained output image, the processing for protecting the selected privacy object in the identified region may be performed, and the output image including the region in which the processing is performed may be displayed.

According to the various embodiments of the present disclosure, it is possible to efficiently protect the privacy of certain objects included in the photo or image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, the present disclosure is described in detail with reference to the accompanying drawings.

General terms are selected as those terms are used in consideration of their functions in the present disclosure, and may be changed based on intentions of those skilled in the art or a judicial precedent, emergence of a new technique, or the like. In addition, where terms are arbitrarily chosen by applicant, such terms shall be given the meaning described in detail in the corresponding portions of the present disclosure.

In the present disclosure, an expression "have," "may have," "include," "may include," or the like, indicates the existence of a corresponding feature (for example, a numerical value, a function, an operation, or a component such as a part), and does not exclude the existence of an additional feature.

An expression, "at least one of A or/and B" may indicate either "A or B," or "both of A and B."

Expressions "first," "second," and the like, used in the present disclosure, may indicate various components regardless of the sequence and/or importance of the components.

These expressions are used only to distinguish one component from another component, and do not limit the corresponding component.

In case that any component (for example, a first component) is mentioned to be "(operatively or communicatively) coupled with/to" or "connected to" another component (for example, a second component), it is to be understood that the any component may be directly coupled to the another component or may be coupled to the another component through still another component (for example, a third component).

A term of a singular number may include its plural number unless explicitly indicated otherwise in the context. It is to be understood that a term "include," "formed of," or the like used in the present application specifies the presence of features, numerals, steps, operations, components, parts, or combinations thereof, which is mentioned in the specification, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module and implemented by at least one processor except for a "module" or a "~er/or" that needs to be implemented by a specific hardware.

In the present disclosure, a term "user" may refer to a person using an electronic apparatus or an apparatus (e.g. artificial intelligence electronics) using the electronic apparatus.

Hereinafter, the embodiments of the present disclosure are described in detail with reference to the accompanying drawings.

Figure 1:
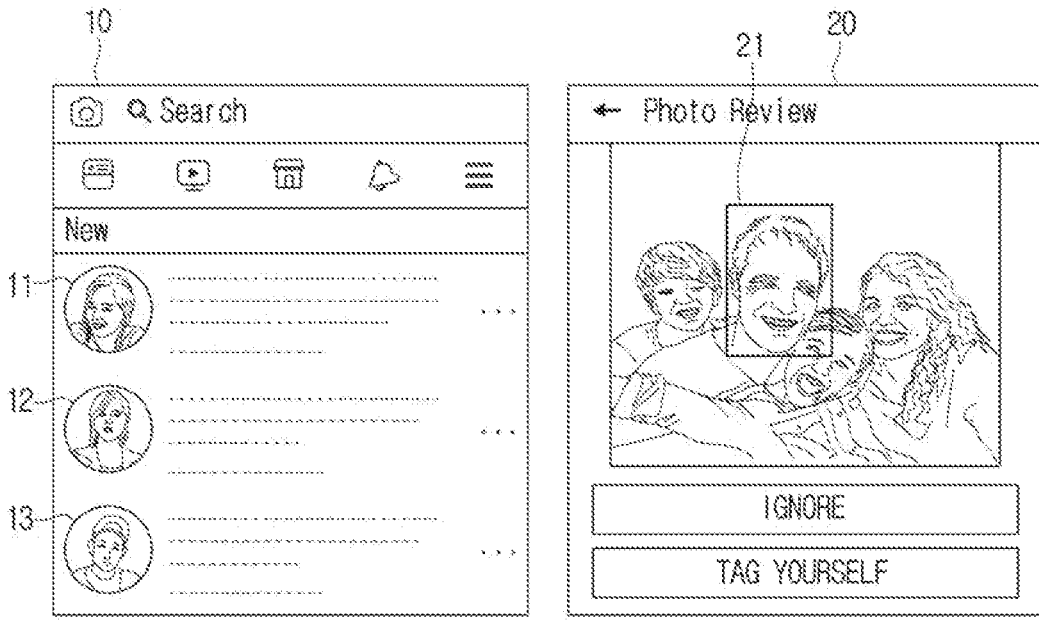
FIG. 1 is a view for explaining privacy protection technology to assist in understanding of the present disclosure.

FIG. 1 is a view for explaining privacy protection technology to assist in understanding of the present disclosure.

An electronic apparatus 100 according to an embodiment of the present disclosure may execute an application that provides a social network service (SNS) and thus provide an application screen. Here, a photo of a user himself/herself or another user may be uploaded through the application, and in this case, the photo may be provided to a plurality of users who may access a corresponding SNS account. Another user may upload the photo of the user or the like, and in this case, the electronic apparatus 100 may provide the user with notifications 11, 12, and 13 through a SNS notification screen 10.

Here, the user or another user may not want his/her image 21 to be disclosed through SNS, and in this case, it is necessary to process and provide a corresponding image for privacy protection.

Hereinafter, the description describes various embodiments in which the electronic apparatus 100 processes and provides an object requiring the privacy protection according to the various embodiments of the present disclosure.

Figure 2:
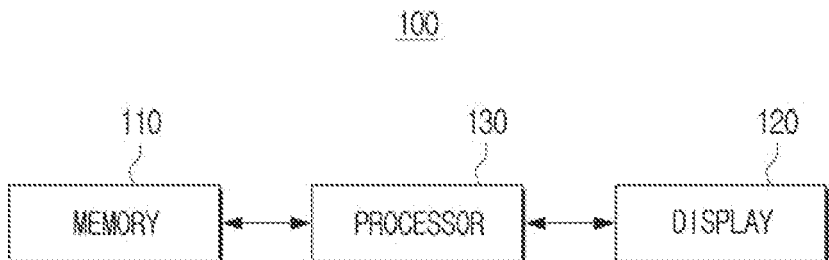
FIG. 2 is a block diagram for explaining a configuration of an electronic apparatus according to an embodiment of the present disclosure.

FIG. 2 is a block diagram for explaining a configuration of the electronic apparatus according to an embodiment of the present disclosure.

Referring to FIG. 2, the electronic apparatus 100 may include a memory 110, a display 120, and a processor 130. The electronic apparatus 100 may be implemented as a smartphone, but is not limited thereto, and may be implemented as any of various devices which may execute an application, for example, a tablet personal computer (PC), a mobile phone, a video phone, a desktop PC, a laptop PC, a netbook computer, a workstation, a personal digital assistants (PDA), a portable multimedia player (PMP), a moving picture experts group (MPEG) audio layer-3 (MP3) player, a camera, a virtual reality (VR) implementation device, or a wearable device.

The memory 110 may store data necessary for various embodiments of the present disclosure. The memory 110 may be implemented in the form of a memory embedded in the electronic apparatus 100, or may be implemented in the form of a memory detachable from the electronic apparatus 100, based on a data storing purpose. For example, data for driving the electronic apparatus 100 may be stored in the memory embedded in the electronic apparatus 100, and data for an extension function of the electronic apparatus 100 may be stored in the memory detachable from the electronic apparatus 100. Meanwhile, the memory embedded in the electronic apparatus 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash memory (for example, a NAND flash, or a NOR flash), a hard drive, or a solid state drive (SSD)). In addition, the memory detachable from the electronic apparatus 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), an external memory which may be connected to a universal serial bus (USB) port (for example, a USB memory), or the like.

For example, the memory 110 may store at least one instruction for controlling the electronic apparatus 100 or a computer program including the instructions.

For another example, the memory 110 may store information on a neural network model including a plurality of layers. Here, storing the information on the neural network model may be storing various information related to an operation of the neural network model, for example, information on the plurality of layers included in the neural network model, a parameter used in each of the plurality of layers (for example, filter coefficients or bias). For example, the memory 110 may store information on a neural network model trained to obtain recommended administrative information according to an embodiment. However, the processor 130 may be implemented as hardware dedicated to the neural network model, and in this case, the information on the neural network model may be stored in an internal memory of the processor 130.

As an implementation example, the memory 110 may be implemented as a single memory for storing data generated in various operations according to the present disclosure. However, as another implementation example, the memory 110 may be implemented to include a plurality of memories respectively storing different types of data or respectively storing data generated in different steps.

For example, the memory 110 may store an application and at least one instruction executed by the processor 130. Here, the instruction may be an instruction for the processor 130 to obtain an output image by inputting an input image to the neural network model.

For another example, the memory 110 may store the neural network models according to various embodiments of the present disclosure. Here, the neural network model may be a machine learning model on the basis of a plurality of images. For example, the neural network model may be a convolution neural network (CNN) or deep neural network (DNN) trained model on the basis of at least one of a plurality of sample images or training images.

Here, the CNN is a multilayer neural network having a special connection structure designed for speech processing and image processing, and the deep neural network (DNN) is a representative example of an artificial neural network model that simulates a brain nerve.

The above-described neural network models are some of various embodiments of the present disclosure, and the neural network model is not limited to the CNN or the DNN.

The description above describes that the electronic apparatus 100 according to an embodiment of the present disclosure stores the neural network model in the memory 110. However, the neural network model may be stored in a separate server other than the electronic apparatus 100.

In this case, the electronic apparatus 100 may include a communication device, and the processor 130 may control the communication device to transmit and receive data to and from the server storing the neural network model. For example, the electronic apparatus 100 may transmit a plurality of patches obtained from the input image to the server, and receive information on a privacy object obtained through the neural network model from the server.

The display 120 may be implemented as any of various types of displays such as a liquid crystal display (LCD), an organic light emitting diode (OLED) display, a quantum dot light-emitting diode (QLED) display, and a plasma display panel (PDP). The display 120 may include a driving circuit, a backlight unit, and the like, which may be implemented in the form such as a thin film transistor (TFT), low temperature poly silicon (LTPS) TFT, or an organic TFT (OTFT). Meanwhile, the display 120 may be implemented as a touch screen combined with a touch sensor, a flexible display, a three-dimensional (3D) display, or the like.

The processor 130 may control overall operations of the electronic apparatus 100.

In detail, the processor 130 may be connected to each component of the electronic apparatus 100 to thus control the overall operations of the electronic apparatus 100. For example, the processor 130 may be connected to the memory 110 and the display 120 to thus control the operations of the electronic apparatus 100.

For example, the processor 130 may be indicated by any of various names such as a digital signal processor (DSP), a microprocessor, a central processing unit (CPU), a micro controller unit (MCU), a micro processing unit (MPU), a neural processing unit (NPU), a controller, and an application processor (AP), and the present specification uses its name as the processor 130. The processor 130 may be implemented as a system-on-chip (SoC) or a large scale integration (LSI), or may be implemented in the form of a field programmable gate array (FPGA). In addition, the processor 130 may include a volatile memory such as a static random access memory (SRAM).

In addition, the processor 130 for executing the neural network model according to an embodiment may be implemented through a combination of a processor and software, the processor including a general-purpose processor such as the CPU, the AP or the DSP, a graphics-only processor such as a graphic processing unit (GPU) or a vision processing unit (VPU), or a neural network dedicated processor such as the NPU. The processor 130 may perform control to process input data based on a predefined operation rule or the neural network model, stored in the memory 110 or the separate server. Alternatively, the processor 130 may be a processor dedicated to a neural network, and in this case, the processor 130 may be designed to have a hardware structure specialized for processing a specific neural network model. For example, hardware specialized for processing a specific neural network model may be designed as a hardware chip such as an application specific integrated circuit (ASIC) or the FPGA. The processor 130 may be implemented as a dedicated processor, and in this case, the processor 130 may be implemented to include a memory for implementing the embodiments of the present disclosure, or may be implemented to include a memory processing function for using an external memory.

The processor 130 according to an embodiment may execute the application to differentiate the input image into the plurality of patches, and obtain the information on the privacy object included in the input image by inputting the plurality of patches into the neural network model. Here, each of the plurality of patches may be a pixel region including a plurality of pixels, and may have an n*n shape. For example, a size of the patch may be 5*5, is not limited thereto, and may be implemented in various sizes such as 3*3, 4*4, and the like.

For example, the plurality of patches may be implemented as an overlapping patch in which some pixel regions overlap each other, and are not limited thereto. For another example, the plurality of patches may be implemented as a non-overlapping patch in which the pixel regions do not overlap each other. Here, the reason why the input image is differentiated into the plurality of patches is that the processor 130 may have computational burdens less than those when processing an entire input image including the plurality of pixels at once.

Next, the processor 130 may obtain the output image including a guide graphical user interface (GUI) for guiding the privacy object on the basis of the obtained information, and control the display 120 to display the obtained output image. Here, the privacy object refers to an object that may cause privacy infringement when disclosed to an unspecified number of people.

For example, the privacy object may be a person's face, contents of a document, or various other objects that the user does not want to disclose to other users.

Here, the information on the privacy object may include at least one of information on a type of the privacy object, information on a region where the privacy object is located, and information on importance of the privacy object.

Here, the guide GUI is for guiding a location of the privacy object included in the input image, and the electronic apparatus 100 may output the output image including the guide GUI, thereby providing the user with a prompt for the privacy object. A user command may be input through an input device 150, and in this case, the processor 130 may provide feedback through the guide GUI or control the display 120 to remove the guide GUI.

Here, the processor 130 may control the display 120 to display the output image on which processing for protecting a selected privacy object is performed when the privacy object and one of a plurality of processing methods for protecting the privacy object are selected through the guide GUI.

For example, the processor 130 may perform at least one of blur processing, single-color processing, or emoji processing on the selected privacy object.

As another implementation example, a region including the privacy object may be selected by the user's touch input.

For example, the processor 130 may designate the region including the privacy object on the basis of the input through a stylus pen 30.

The stylus pen 30 is a writing instrument using an electronic principle, and may be a device for performing writing on the smartphone, the PDA, or the tablet computer, equipped with the touch screen. The stylus pen 30 may be implemented to be coupled to the electronic apparatus 100, is not limited thereto, and may be implemented as a product separate from the electronic apparatus 100.

The processor 130 may identify a region selected by the touch input through the stylus pen 30 as the region including the selected privacy object (hereinafter, a privacy object region), and perform the processing for protecting the selected privacy object in the identified region.

The privacy object region may be selected through the stylus pen 30, and in this case, omitted is a process in which the processor 130 differentiates the input image into the plurality of patches and obtains the information on the privacy object. Accordingly, omitted is the step of selecting the privacy object through the GUI displayed on the display 120, and the processor 130 may thus more quickly perform the process for protecting the privacy object.

Furthermore, the privacy object region may be selected through the stylus pen 30, and in this case, the processor 130 may not include information on the plurality of processing methods for protecting the privacy object in the output image. Instead, the processor 130 may identify the processing method for the privacy object from the input through operation of a button included in the stylus pen 30 or a gesture.

Meanwhile, the processor 130 may differentiate a first frame included in the input image into a plurality of first patches, and input the plurality of first patches to the neural network model, thereby obtaining the information on the privacy object included in the first frame. Next, the processor 130 may track the privacy object identified in a frame after the first frame and identify the privacy object in the frame after the first frame when identifying the privacy object in the first frame on the basis of the information on the privacy object.

In addition, the processor 130 may differentiate the input image into the plurality of overlapping patches in which at least some regions overlap each other, and input the plurality of overlapping patches to the neural network model, thereby obtaining the information on the privacy object included in the image.

The reason for differentiating the input image into overlapping patches is to allow the processor 130 to perform post-processing on overlapping portions after processing the input image in units of patches. For example, the post-processing may use average value processing for the overlapping regions of the patches.

Meanwhile, the processor 130 may filter the output image by applying a preset image filter to the output image, and control the display 120 to display the filtered image.

In detail, the preset image filter may include at least one of an adversarial noise filter or a watermark filter for another neural network model.

As described above, the processor 130 may replace the privacy object itself selected for the privacy protection with an emoji, blur the privacy object, or perform single-pixel processing on the privacy object. Through this processing, the input image may protect privacy from other people's eyes.

However, an appearance of the input image itself may be changed or the input image may become unnatural by this processing of the processor 130.

Accordingly, in addition to the method of protecting the privacy from the human eyes, the processor 130 may also perform image processing in a manner of protecting the privacy from another neural network model by applying the preset image filter to the input image.

For example, the human eyes may not distinguish the input image from the output image in which the adversarial noise filter is applied to the input image. However, another neural network model may recognize the output image to which the adversarial noise filter is applied as an image completely different from the input image.

Likewise, the watermark filter may protect the privacy from another neural network model without significantly affecting the appearance of the input image.

The above-described two filters are only examples of the preset image filters, and the preset image filter may include any filter which may protect the privacy object from another neural network model.

Figure 7A:
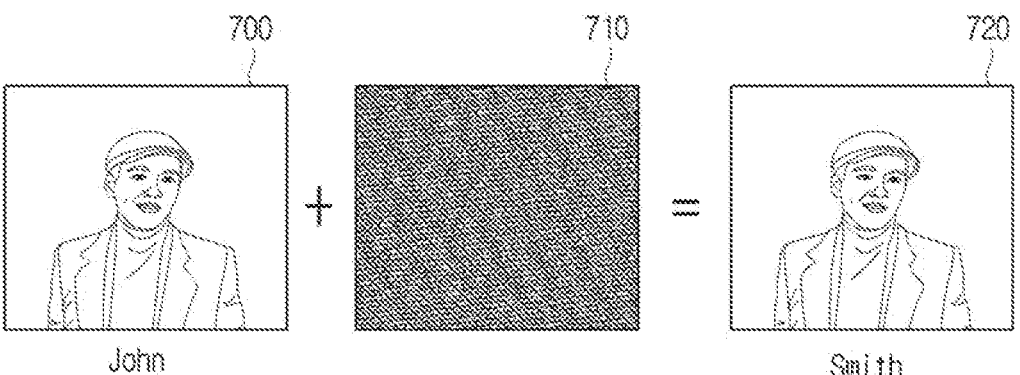
FIG. 7A is a view for explaining that an adversarial noise filter is applied to an entire input image.
Figure 7B:
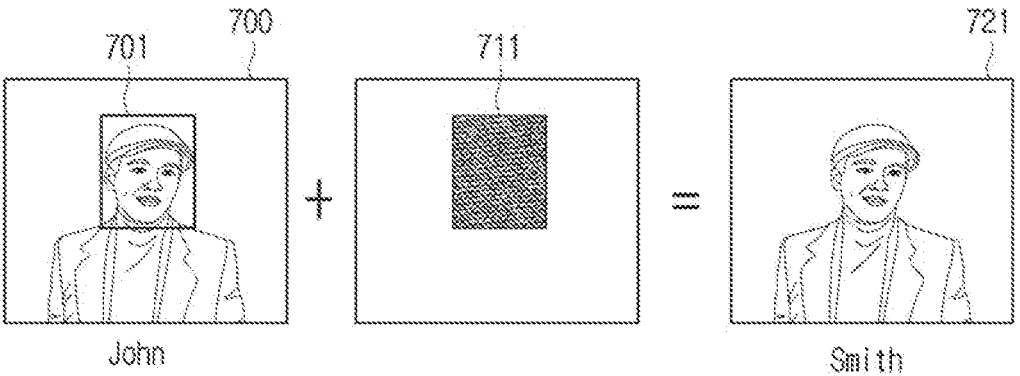
FIG. 7B is a view for explaining that the adversarial noise filter is applied to a portion of the input image.
Figure 7C:
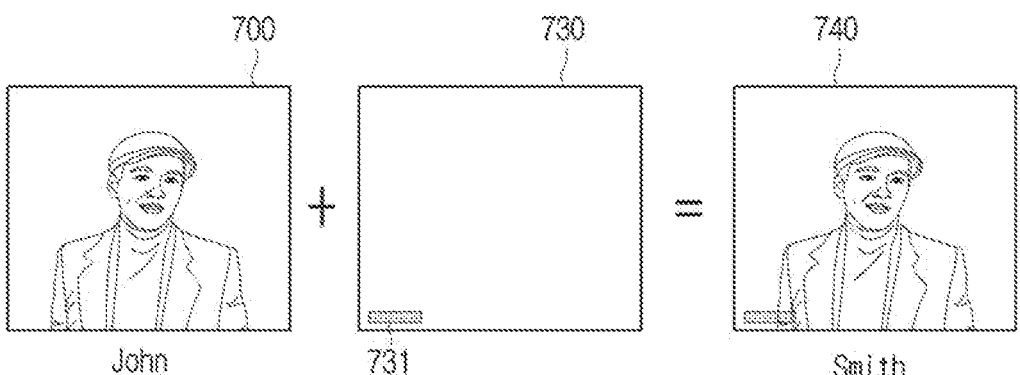
FIG. 7C is a view for explaining that a watermark filter is applied to the input image.

The description describes a process in which the processor 130 applies the preset image filter to the input image in detail with reference to FIGS. 7A to 7C.

The electronic apparatus 100 may not protect the privacy from other people's eyes by the above-described methods. However, the privacy object included in the input image may not be detected by another neural network model, and the electronic apparatus 100 may thus limitedly protect the privacy in an online environment such as the SNS.

Here, the processor 130 may control the display 120 to display a user interface (UI) for selecting at least one of the adversarial noise filter or the watermark filter, and control the display 120 to display the output image to which the image filter selected through the UI is applied.

Figure 3A:
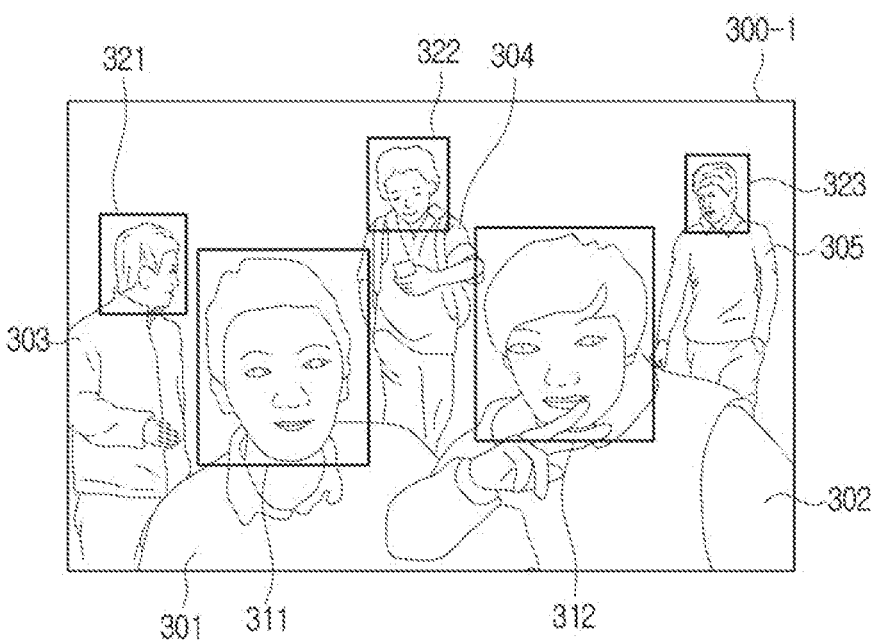
FIG. 3A is a view for explaining an example of a privacy object.

FIG. 3A is a view for explaining an example of the privacy object.

A first example of the privacy object is the faces of people who do not want to be included in a photo, etc.

Referring to FIG. 3A, five people are included in a photo 300-1.

Among the five people included in the photo 300-1, the other three people 303, 304 and 305 may be passersby who do not want to be included in the photo 300-1 except for the two people 301 and 302 looking forward. The passersby may not want their faces to be included in the photo.

The two people 301 and 302 looking forward may also not like their facial expressions included in the photo, and in this case, they may wish that their faces are not included in the photo.

Accordingly, the processor 130 may identify all the faces of people included in the photo 300-1 as the privacy objects.

Next, the electronic apparatus 100 may display an output image including guide GUIs 311, 312, 321, 322, and 323 guiding the faces of people identified as the privacy objects.

The user may select a privacy object desired to be protected through the guide GUI, and in this case, the electronic apparatus 100 may display the output image by performing the processing for protecting the object.

For example, the user may use an input to protect privacy of the passersby 303, 304 and 305 included in the photo, and in this case, the processor 130 may perform the preset processing on the regions 321, 322, and 323 including the privacy object corresponding to the passersby's faces.

Figure 3B:
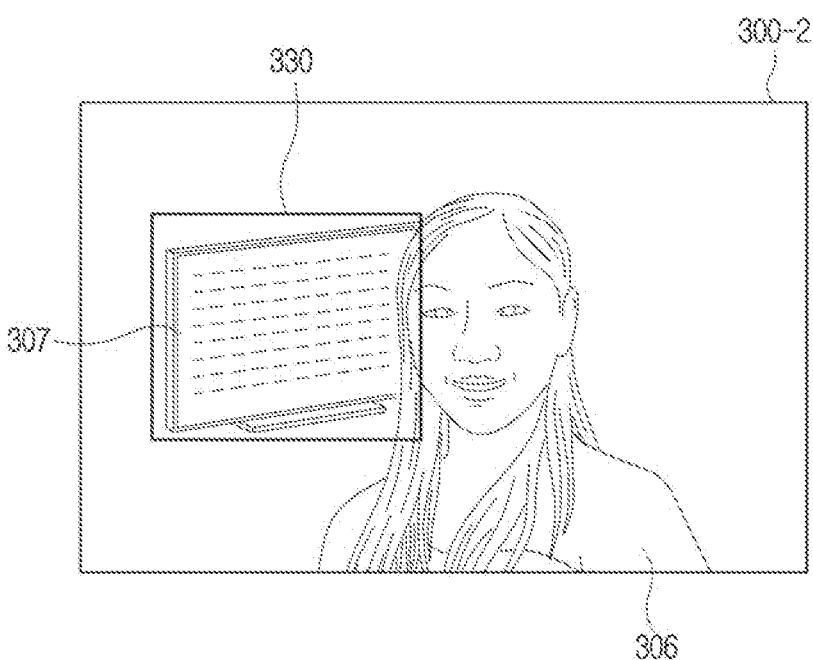
FIG. 3B is a view for explaining another example of the privacy object.

FIG. 3B is a view for explaining another example of the privacy object.

A second example of the privacy object is content of a document that needs to be secured.

Referring to FIG. 3B, a monitor 307 is located behind a user 306 in a photo 300-2.

Content displayed on the monitor 307 may be content of an important document to be secured. The photograph may be taken while overlooking that the content of the important document may be included in the photo, and in this case, the user 306 may not want the content of the document to be included in the photo 300-2.

Accordingly, the electronic apparatus 100 may identify the monitor screen 307 as the privacy object and display an output image including a GUI indicating a region 330 including the same.

FIG. 3B shows that the privacy object is displayed on the monitor 307. However, the privacy object is not necessarily limited thereto, and may have the form of a hard copy such as a book or a handout.

Figure 3C:
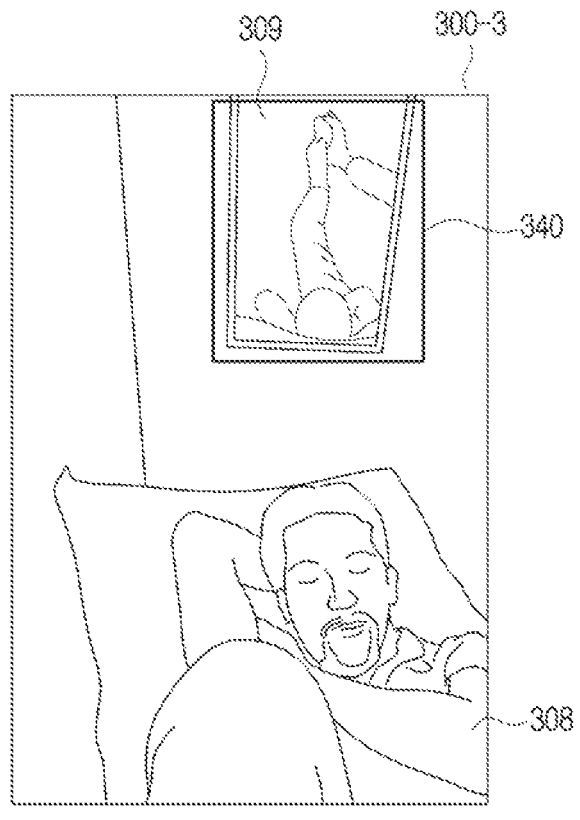
FIG. 3C is a view for explaining still another example of the privacy object.

FIG. 3C is a view for explaining still another example of the privacy object.

A third example of the privacy object is a reflection in a mirror.

Referring to FIG. 3C, an image of a user 308 is reflected on a rear mirror surface 309 and photographed in a photo 300-3. The user 308 may not want to be included in the photo 300-3 as a user image located other than a viewing angle of a photographing device of the electronic apparatus 100 is reflected on the mirror surface 309.

Accordingly, the electronic apparatus 100 may identify the mirror surface 309 as the privacy object, and display an output image including a GUI indicating a region 340 including the same.

Figure 4A:
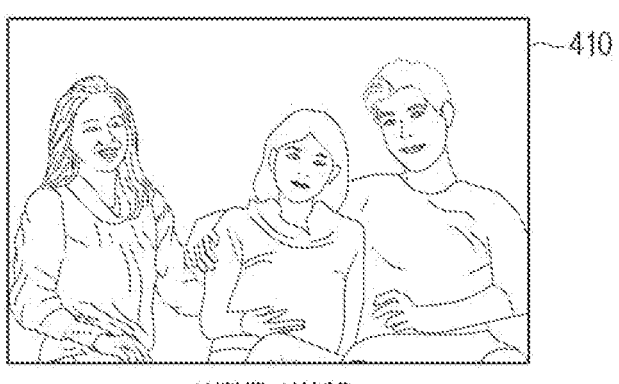
FIG. 4A is a view for explaining that the privacy object is detected in an input image.
Figure 4A:
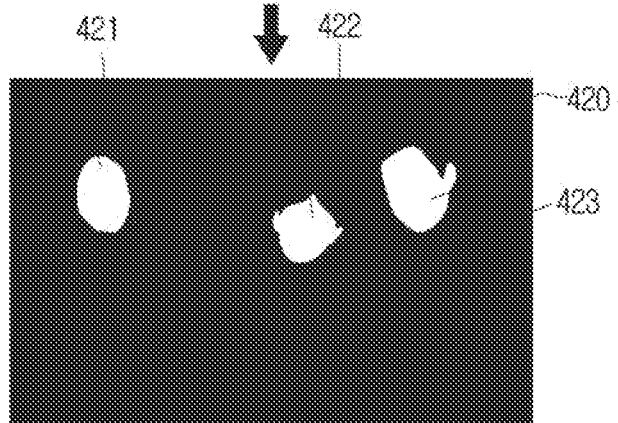
Figure 4A:
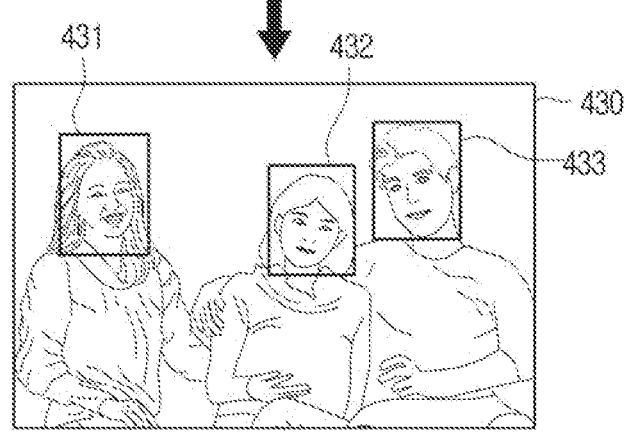

FIG. 4A is a view for explaining that the privacy object is detected in an input image.

Three people are included in an input image 410. The processor 130 may detect human faces 421, 422, and 423 as the privacy objects in step 420 of detecting the privacy object.

Next, the electronic apparatus 100 may obtain and display an output image including a GUI for guiding regions 431, 432, and 433 respectively including faces 421, 422, 423 identified as the privacy objects.

The processor 130 may perform the processing for protecting the privacy object by using a processing method selected by the user.

Although not shown in FIG. 4A, the processor 130 may additionally include, in the output image, a GUI for guiding the plurality of processing methods for protecting the privacy object selected by the user.

Next, one of the plurality of processing methods may be selected by the user's input (e.g., touch input through the user's hand or touch input through the stylus pen), and in this case, the processor 130 may perform the processing for protecting the privacy object based on the selected processing method. The processing method may include the emoji processing, the blur processing, the single-color processing, and the like, and is not limited thereto.

Figure 4B:
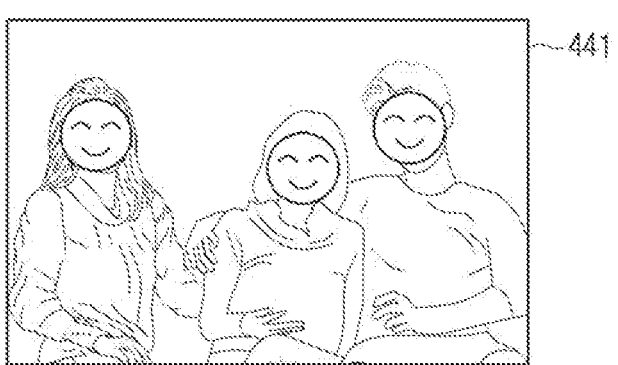
FIG. 4B is a view for explaining an example of a processing method of the privacy object.
Figure 4C:
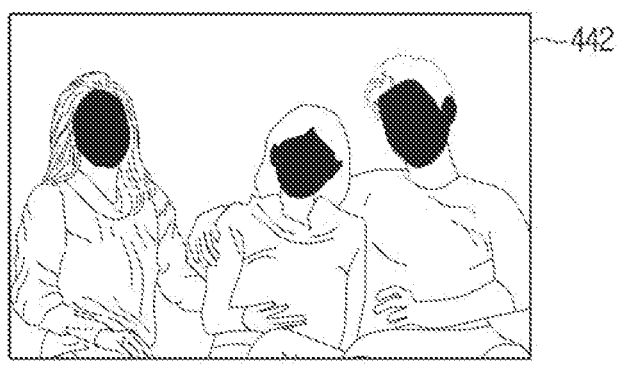
FIG. 4C is a view for explaining another example of the processing method of the privacy object.
Figure 4D:
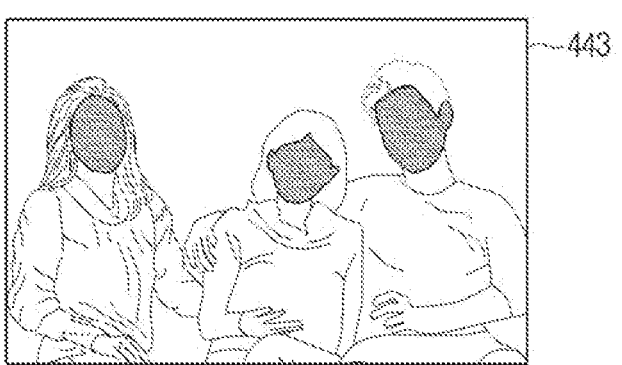
FIG. 4D is a view for explaining still another example of the processing method of the privacy object.

FIGS. 4B to 4D are views for explaining the plurality of processing methods for each protecting a privacy object. The user may select a privacy object through a GUI displayed in FIG. 4A, the processor 130 may perform the processing for protecting the selected privacy object. Referring to FIGS. 4B to 4D, the description is provided on the premise that the user selects all faces 421, 422, and 423 as the privacy objects to be protected.

FIG. 4B is a view for explaining an example of the processing method of the privacy object.

The processor 130 may perform the emoji processing on the selected privacy object. The emoji may be pre-stored in the memory 110 or downloaded online.

The processor 130 may apply the emoji on the basis of the user's input, or the processor 130 may apply any emoji.

FIG. 4C is a view for explaining another example of the processing method of the privacy object.

The processor 130 may perform the single-color processing on the selected privacy object. FIG. 4C shows that the selected privacy objects 431, 432, and 433 are converted into black pixels. However, a single color is not necessarily limited to a black color.

FIG. 4D is a view for explaining still another example of the processing method of the privacy object.

The processor 130 may perform the blur processing on the selected privacy object. FIG. 4D shows that the selected privacy objects 431, 432, and 433 are converted to be blurred using a Gaussian filter. However, it is not necessary to use the Gaussian filter. The blur processing may use any filter that generates a smoothing effect by removing noise in the image.

In addition, the processor 130 may use various methods for protecting the privacy object in addition to the processing methods described with reference to FIGS. 4B to 4D.

Figure 5:
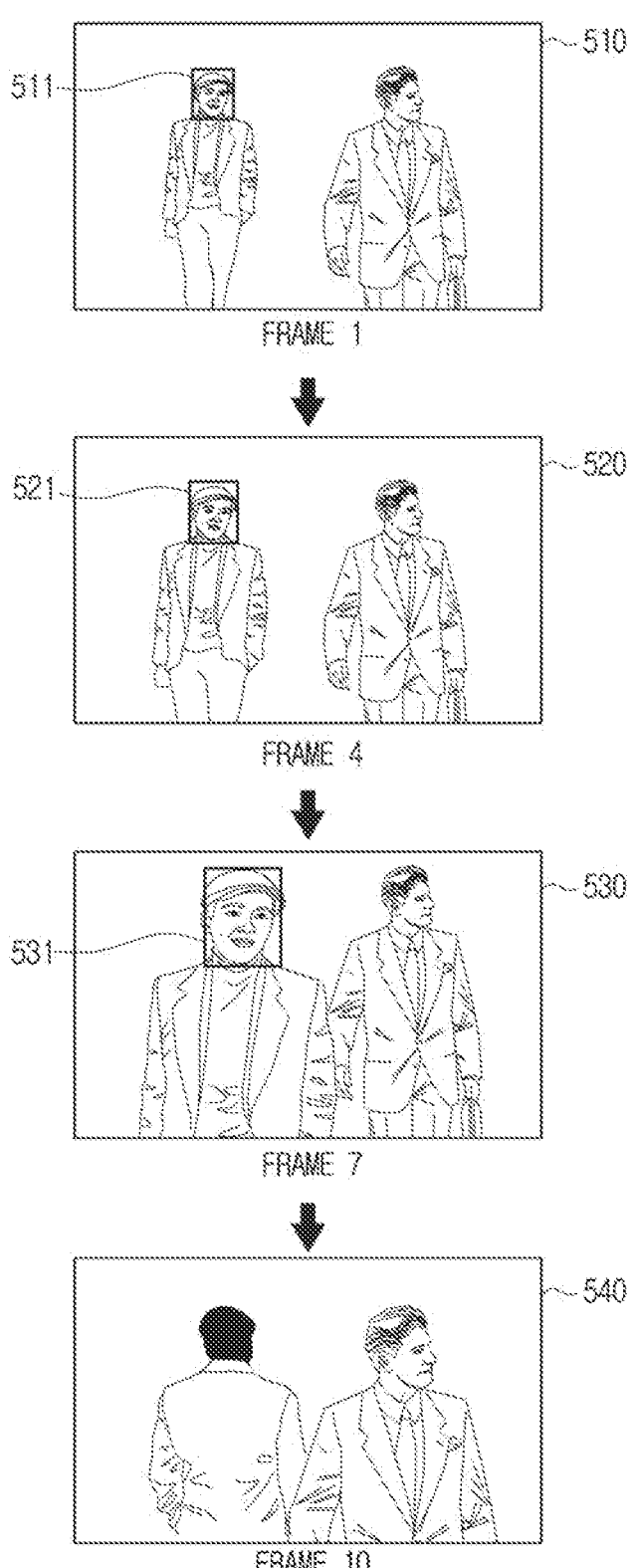
FIG. 5 is a view for explaining tracking of the privacy object.

FIG. 5 is a view for explaining tracking of the privacy object.

In a frame 1 (510), the processor 130 may identify the face of a person walking from a left side of a screen as the privacy object. A region 511 indicated by the guide GUI includes the identified privacy object.

The processor 130 may identify the privacy object once, and then track the same throughout the frames.

The processor 130 according to an embodiment of the present disclosure may track the privacy object by continuously using a deep learning model, or extract a feature such as Harris Corner from the detected privacy object, and track the privacy object by using algorithms such as random sample consensus (RANSAC) or Kanade-Lucas-Tomasi (KLT). The processor 130 may track the privacy object by using such an algorithm, thereby reducing its computational burden.

Referring to a frame 4 (520) and a frame 7 (530), the electronic apparatus 100 may continuously track the initially identified privacy object and display guide GUIs 521 and 531 for guiding the same.

Meanwhile, the processor 130 may stop the tracking when the identified privacy object is significantly changed.

Referring to a frame 10 (540), the previously identified privacy object may disappear as the person on the left side of the screen changes a direction, and in this case, the processor 130 may stop the tracking and detect a new privacy object.

Figure 6A:
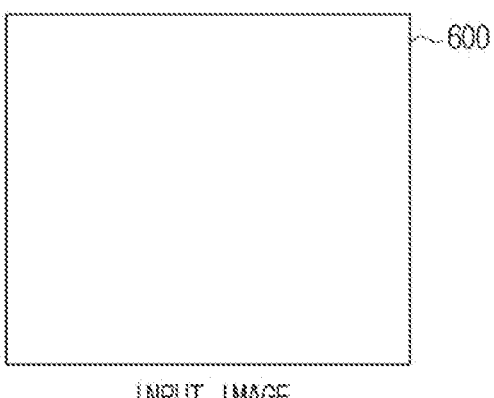
FIG. 6A is a view for explaining an example of differentiating an input image.
Figure 6A:
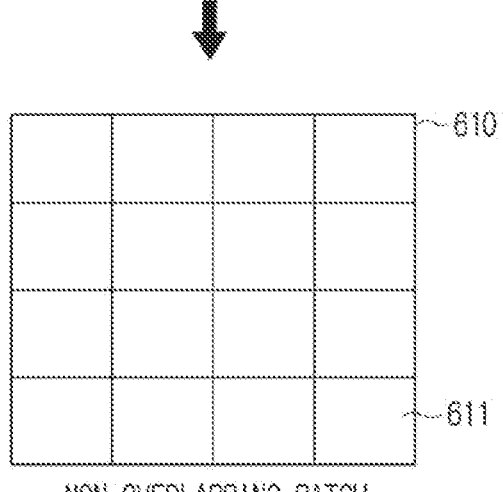
Figure 6B:
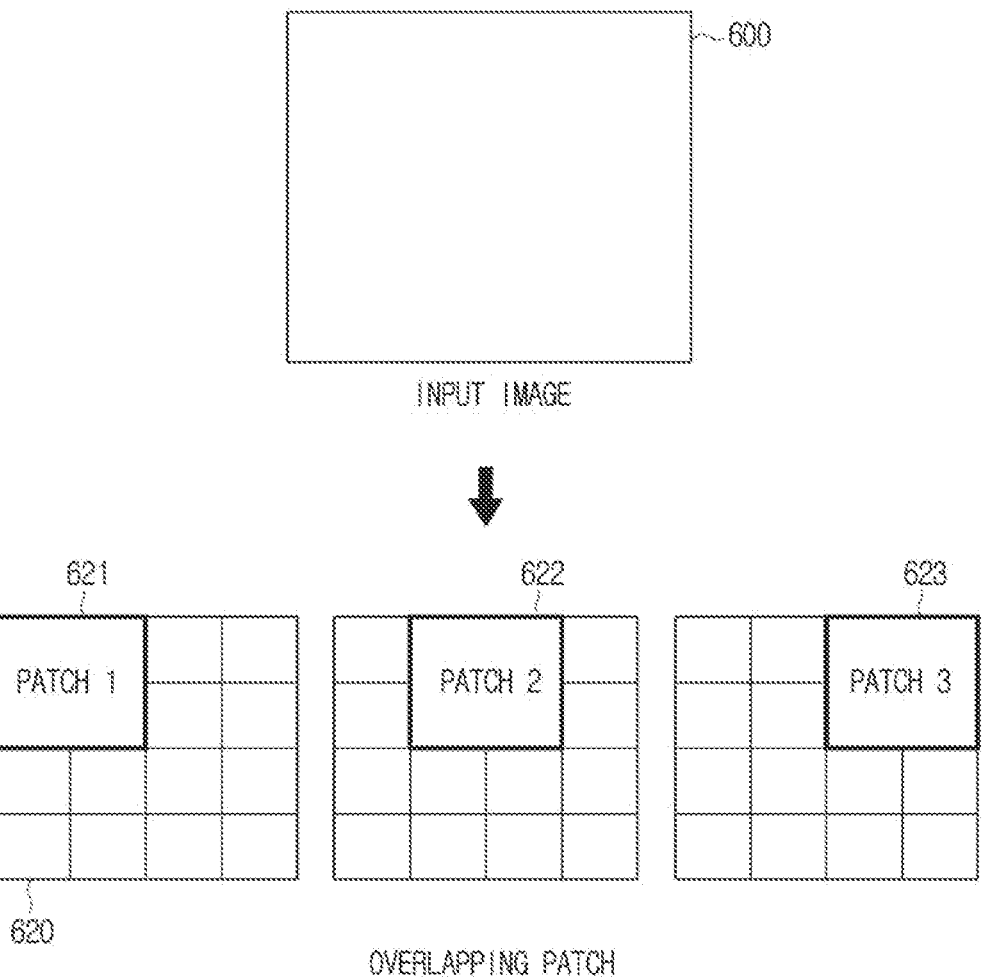
FIG. 6B is a view for explaining another example of differentiating the input image.

FIGS. 6A and 6B are views for explaining a method of differentiating an input image 600.

Referring to FIG. 6A, the processor 130 according to an embodiment of the present disclosure may differentiate the input image 600 into a plurality of patches 611. In this case, the processor 130 may differentiate the input image 600 into a plurality of patches 610 that do not overlap each other.

Next, the processor 130 may perform the processing by the neural network model in units of differentiated patches. The patch-unit processing may give the less computational burden to the processor 130, and is thus a method commonly used in an image processing related technology field.

Referring to FIG. 6B, the processor 130 according to another implementation example of the present disclosure may differentiate the input image 600 into a plurality of patches 620 in which at least some regions overlap each other.

A patch 1 (621) which is one of the overlapping patches has a partial region overlapping that of a patch 2 (622) of another adjacent overlapping patch. Likewise, the patch 2 (622) has a partial region overlapping those of other adjacent overlapping patches 621 and 623.

The image may be differentiated by the overlapping patches, and in this case, the processor 130 may have improved accuracy of obtaining the information on the privacy object through the neural network model.

FIG. 6B shows that each size of the plurality of overlapping patches 621, 622, and 623 is a 2×2 patch which is four times that of the non-overlapping patch 611. However, these patches may be differentiated into patches of different sizes. In addition, a size of the overlapping region overlapping other adjacent overlapping patches may also be arbitrarily set.

For example, the size of the patch and the size of the overlapping region may be increased. In this case, the electronic apparatus 100 may have improved performance, whereas the processor 130 may have increased processing time and lower resolution of the image. Therefore, it is necessary to appropriately set the size of the patch and the size of the overlapping region.

FIGS. 7A to 7C are views for explaining a processing method of the input image to prevent another neural network model from detecting the privacy object.

FIG. 7A is a view for explaining that the adversarial noise filter is applied to the entire input image.

The processor 130 according to an embodiment of the present disclosure may apply the adversarial noise filter to the entire input image. The processor 130 may apply the adversarial noise filter to give a small change to the input image to prevent another neural network model from accurately detecting the privacy object included in the input image.

In applying the noise filter, the processor 130 may process the input image on the basis of one of a white box method and a black box method.

Here, the white box method is a processing method assuming that another neural network model may recognize and have access to all information including architecture, input, output, and weight.

On the other hand, the black box method is a processing method assuming that another neural network model has access to only the information on the input and output, and has no access to the information on the architecture and weight.

In addition, the processor 130 may apply the adversarial noise filter through various approaches. For example, the processor 130 may process the input image through a fast gradient sign method (FGSM), a projected gradient descent, a momentum repetition attack, a generative adversarial network (GAN)-based attack, or the like.

Figure 8:
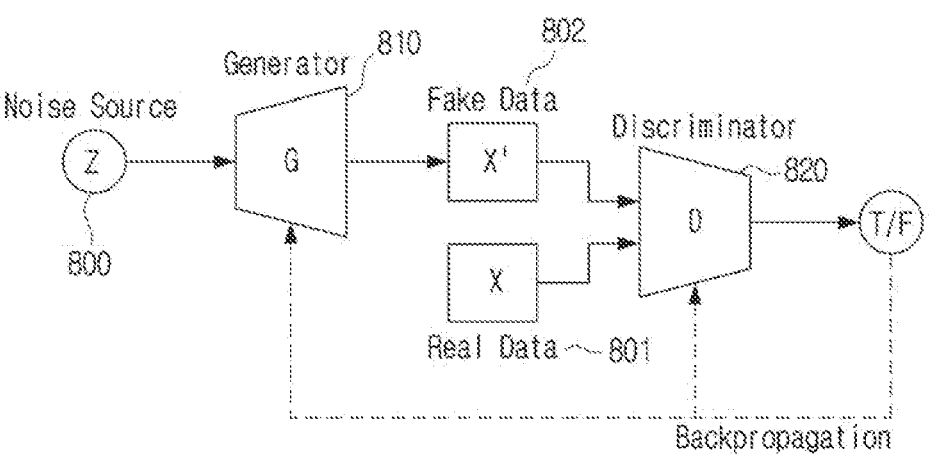
FIG. 8 is a view for explaining a neural network model according to an embodiment of the present disclosure.

The description describes the GAN-based attack according to an embodiment of the present disclosure in detail with reference to FIG. 8.

Referring to FIG. 7A, the electronic apparatus 100 may display an output image 720 by applying an adversarial noise filter 710 to an input image 700.

In this case, human eyes may not distinguish the output image 720 from the input image 710, whereas another neural network model may recognize the output image 720 as an image completely different from the input image 700.

As a result, another neural network model is unable to accurately detect the privacy object (face or the like) included in the input image 700 from the output image 720. In this way, the electronic apparatus 100 may perform a function of preventing another neural network model from detecting the privacy object that the user wants to protect from the output image 710 uploaded online.

FIG. 7B is a view for explaining that the adversarial noise filter is applied to a portion of the input image.

Referring to FIG. 7B, the processor 130 may identify a region 701 including the privacy object in the input image 700.

Next, the processor 130 may obtain an output image 721 by applying the adversarial noise filter 711 corresponding to the corresponding region 701 to the input image 700.

In this case, the electronic apparatus 100 may perform the function of preventing another neural network model from detecting the privacy object that the user wants to protect from the output image 721 uploaded online, similar to that described with reference to FIG. 7A.

FIG. 7C is a view for explaining that the watermark filter is applied to the input image.

The processor 130 according to an embodiment of the present disclosure may process the input image 700 by applying a watermark filter 730 including a digital watermark 731 to the input image 700.

The digital watermark may originally be used to insert confidential information such as copyright information into various digital data such as photos and videos.

The digital watermark according to an embodiment of the present disclosure may use name of a manufacturer of the electronic apparatus 100 or name of the application stored in the memory 110, and is not necessarily limited thereto. The digital watermark may use any watermark including a character, a figure, or the like.

The processor 130 according to an embodiment of the present disclosure may insert the digital watermark 731 into the input image 700 to prevent another neural network model from detecting the privacy object in an output image 740.

In this way, the processor 130 may protect the privacy object from another neural network model by applying the digital watermark 731 to the input image 700 as in the case of applying the adversarial noise filter 710.

FIG. 8 is a view for explaining the neural network model according to an embodiment of the present disclosure.

The neural network model according to an embodiment of the present disclosure may be the generative adversarial network (GAN)-based model. The GAN may include a generator 810 generating a virtual data sample and a discriminator 820 determining whether an input data sample is real data. The GAN refers to a machine learning model built through adversarial training between the generator 810 and the discriminator 820.

The generator 810 may be a model that learns to minimize a difference between an image (or fake data, 802) generated from noise (or a noise source, 800) and an input image (or real data, 801), and the discriminator 820 may be a model that identifies a difference value between the image 802 generated by the generator 810 and the input image 801.

Referring to FIG. 8, the generator 810 may be trained to generate an image similar to the input image 801 from the noise 800, and it may be very difficult to distinguish the image 802 generated by the trained generator 810 from the input image 801 with naked eyes.

In order to generate an adversarial example in which the processor 130 according to an embodiment of the present disclosure may attack another neural network model through the GAN, the processor 130 may need to train the generator 810 so that the generator 810 generates the generated image 802 similar to the input image 801 through a certain level of learning.

In a next step, the processor 130 may further train the generator 810 so that the discriminator 820 classifies the generated image 802 as an image different from the input image 801.

As a result, the processor 130 may train the generator 810 to generate the generated image 802 which is classified into the image different from the input image 801 by another neural network model although it is difficult to be distinguished from the input image 801 with the naked eyes.

Figure 9A:
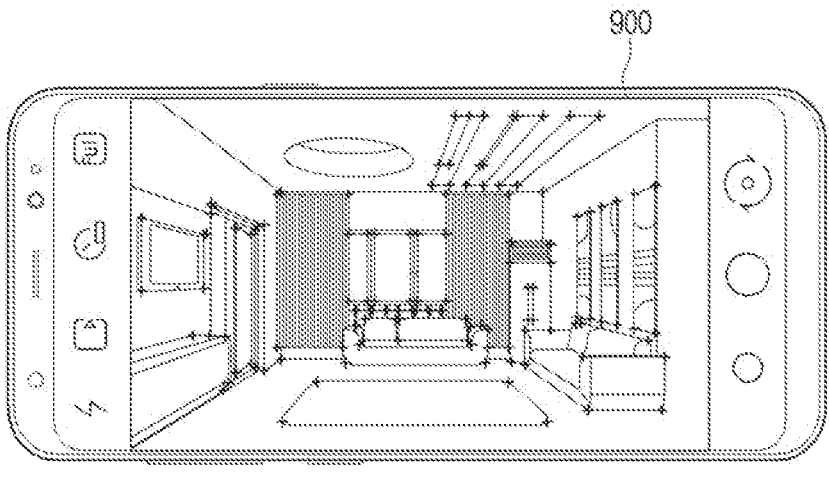
FIGS. 9A and 9B are views for explaining that a region is designated through a stylus pen.
Figure 9A:
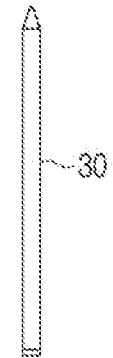
Figure 9B:
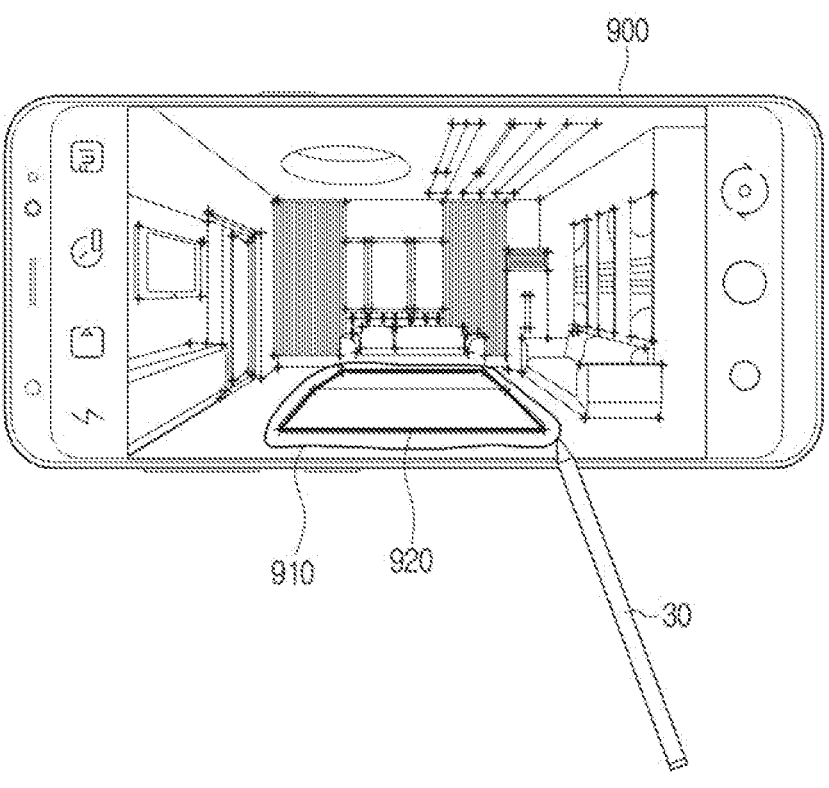

FIGS. 9A and 9B are views for explaining that a region is designated through the stylus pen.

The electronic apparatus 100 according to an embodiment of the present disclosure may be the smartphone. The electronic apparatus 100 may execute the application stored in the memory 110 to display a screen 900 photographed by the smartphone, and receive a touch operation for protecting the privacy object from the user.

The processor 130 may differentiate the input image into the plurality of patches, and identify the privacy object region on the basis of the input through the stylus pen 30 instead of inputting the differentiated patch into the neural network model to obtain the information on the privacy object.

Referring to FIG. 9A, the electronic apparatus 100 may detect and display Harris Corners of subjects on the driving screen 900 displayed by executing the application.

Harris corner detection is a technique for identifying a corner of a subject by using an Eigen vector based on a differential value.

FIG. 9A shows the Harris corner of the subject in the form of a cross.

Referring to FIG. 9B, the electronic apparatus 100 may receive the touch operation using the stylus pen 30 from the user.

In this case, the processor 130 may identify a trajectory 910 input by the user through the stylus pen 30, and identify Harris corners of subjects located closest to the trajectory 910.

Next, the processor 130 may identify a polygon 920 having the identified Harris corner as a vertex, and determine a region occupied by the identified polygon as the selected privacy object region. The processor 130 may perform the processing for protecting the privacy object on the region of the polygon 920.

As described above, the processing method that the processor 130 may perform to protect the selected privacy object may include at least one of the various processing methods such as the blur processing, the single-color processing, the emoji processing, and the image filter application.

Here, the processor 130 may apply any of the processing methods input by the user through a gesture or the operation of the button included in the stylus pen 30.

In the case of the operation through the stylus pen 30, the electronic apparatus 100 may not need to display the guide GUI for guiding the privacy object. Therefore, the processor 130 may have the reduced computational burden, and it may also be convenient for the user to quickly select and protect the privacy object.

Figure 10:
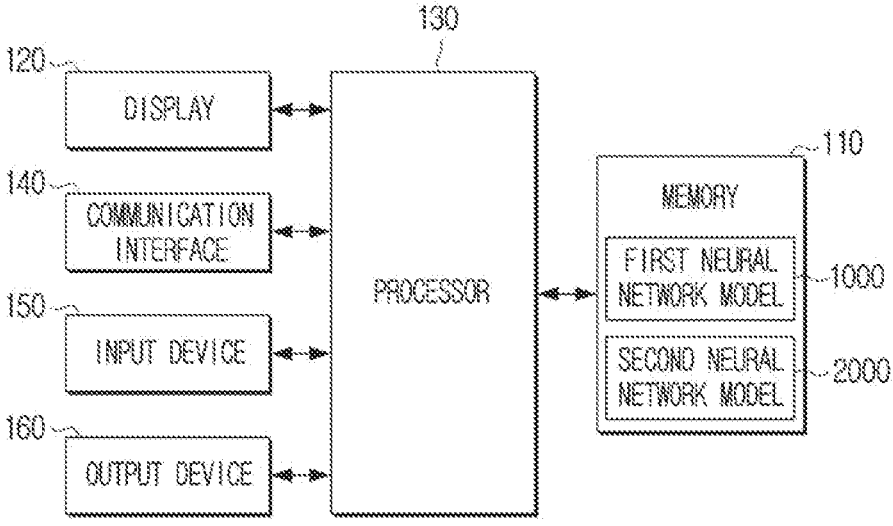
FIG. 10 is a block diagram for specifically explaining a functional configuration of an electronic apparatus according to an embodiment of the present disclosure.

FIG. 10 is a specific block diagram of an electronic apparatus according to an embodiment of the present disclosure.

Referring to FIG. 10, an electronic apparatus 100' may include the memory 110, the display 120, the processor 130, a communication interface 140, an input device 150, and an output device 160.

The memory 110 may store one or more artificial intelligence models. In detail, the memory 110 according to an embodiment of the present disclosure may store a first neural network model 1000 trained to obtain the information on the privacy object from the input image. Here, the first neural network model 1000 may be a model trained using a plurality of sample data, and may be a neural network model trained to obtain the information on the privacy object on the basis of text, still image, or video included in each of the plurality of sample data.

In addition, the memory 110 according to an embodiment of the present disclosure may store a second neural network model 2000 trained to generate an adversarial image that prevents another neural network model from detecting the privacy object from the input image. For example, the second neural network model 2000 may be the generative adversarial network (GAN)-based model.

The communication interface 140 may receive various types of contents. For example, the communication interface 140 may receive the various types of contents from an external device (e.g., source device), an external storage medium (e.g., universal serial bus (USB) memory), an external server (e.g., web hard) or the like by using a communication method such as an access point (AP) based wireless fidelity (Wi-Fi, i.e. wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication. Here, the contents may include an image signal, an article, text information, a post, or the like.

The input device 150 may be implemented as a device such as a button, a touch pad, a mouse, or a keyboard, or may be implemented as a touch screen, a remote control transceiver, or the like, which may perform the above-described display function and an operation input function together. The remote control transceiver may receive or transmit a remote control signal from an external remote control device through at least one of infrared communication, Bluetooth communication, and Wi-Fi communication.

The electronic apparatus 100' may further include a tuner and a demodulator according to an implementation example. The tuner may receive a radio frequency (RF) broadcast signal by tuning a channel selected by the user or all pre-stored channels among RF broadcast signals received through an antenna. The demodulator may receive and demodulate a digital intermediate frequency (DIF) signal converted by the tuner, and also perform channel decoding or the like. The input image received through the tuner according to an implementation example may be processed through the demodulator, and then provided to the processor 130 for the image processing according to an implementation example of the present disclosure.

Figure 11:
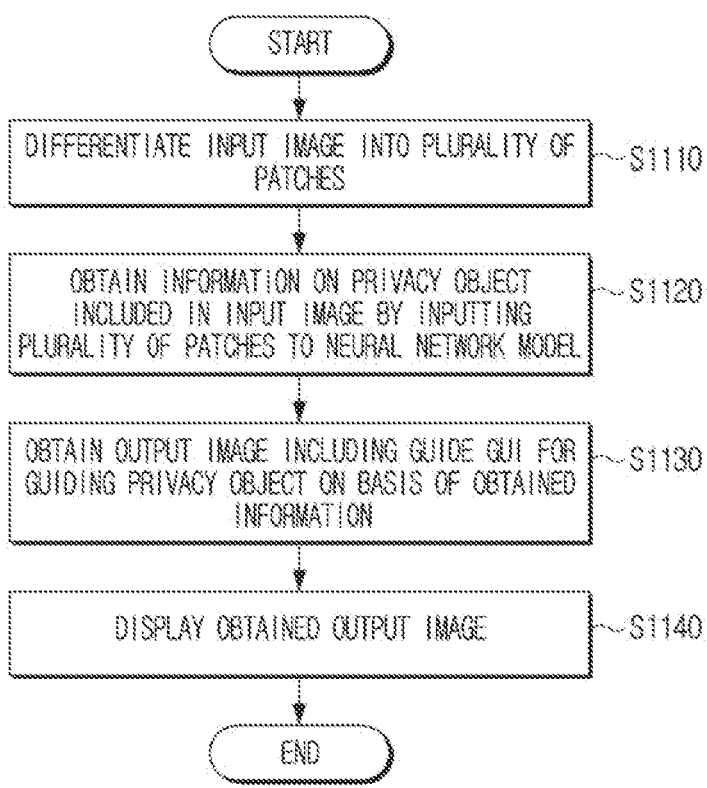
FIG. 11 is a flowchart for explaining a controlling method therefor according to another embodiment of the present disclosure.

FIG. 11 is a flowchart for explaining a control method according to another embodiment of the present disclosure.

The control method for the electronic apparatus according to an embodiment of the present disclosure may first include differentiating an input image into a plurality of patches (S1110).

Next, the method may include obtaining information on a privacy object included in the input image by inputting the differentiated plurality of patches to a neural network model (S1120).

Next, the method may include obtaining an output image including a guide graphical user interface (GUI) for guiding the privacy object on the basis of the obtained information (S1130).

Finally, the method may include displaying the obtained output image (S1140).

Here, in the displaying of the obtained output image (S1140), processing for protecting a selected privacy object may be performed, and the processed output image may be displayed, when the privacy object is selected through the guide GUI.

Here, the method may further include displaying information on a plurality of processing methods for protecting the selected privacy object. In the displaying of the obtained output image (S1140), the selected privacy object may be displayed by being processed by a selected processing method when the privacy object is selected through the guide GUI and one of the plurality of processing methods is selected.

In addition, in the displaying of the obtained output image (S1140), at least one of blur processing, single-color processing, or emoji processing on the selected privacy object may be performed.

Meanwhile, the method may further include identifying a region selected by touch input through a stylus pen as a region including the selected privacy object. In the displaying of the obtained output image (S1140), the processing for protecting the selected privacy object in the identified region may be performed, and the output image including the region in which the processing is performed may be displayed.

Meanwhile, the obtaining of the information on the privacy object (S1120) may include differentiating a first frame included in the input image into a plurality of first patches and inputting the plurality of first patches into the neural network model to obtain the information on the privacy object included in the first frame, and tracking the identified privacy object in a frame after the first frame and identifying the privacy object in the frame after the first frame when the privacy object is identified in the first frame on the basis of the information on the privacy object.

In addition, in the obtaining of the information on the privacy object (S1120), the input image may be differentiated into a plurality of overlapping patches in which at least some regions overlap each other, and the plurality of overlapping patches may be input to the neural network model, thereby obtaining the information on the privacy object included in the input image.

Meanwhile, the method may further include filtering the output image by applying a preset image filter to the output image, and in the displaying of the obtained output image (S1140), the filtered image may be displayed.

Here, the preset image filter may include at least one of an adversarial noise filter or a watermark filter for another neural network model.

Here, the method may further include displaying a user interface (UI) for selecting at least one of the adversarial noise filter or the watermark filter, and in the displaying of the obtained output image (S1140), the output image to which the image filter selected through the UI is applied may be displayed.

Meanwhile, the various embodiments described above may be implemented in a computer or a computer-readable recording medium using software, hardware, or a combination of software and hardware. In some cases, the embodiments described in the specification may be implemented by the processor 130 itself. According to a software implementation, the embodiments such as the procedures and functions described in the present disclosure may be implemented by separate software modules. Each of the software modules may perform one or more functions and operations described in the present disclosure.

Meanwhile, a non-transitory computer-readable medium may store computer instructions for performing the processing operations of the electronic apparatus 100 according to the various embodiments of the present disclosure described above. The computer instructions stored in the non-transitory computer-readable medium may allow a specific device to perform the processing operations of the electronic apparatus 100 according to the various embodiments described above when the computer instructions are executed by a processor of the specific device.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the claims. These modifications should also be understood to fall within the scope and spirit of the present disclosure.

What is claimed is:

1. An electronic apparatus comprising:
at least one memory configured to store computer program code;
a display; and
at least one processor configured to access the at least one memory and operate as instructed by the computer program code, wherein the computer program code comprises:
    differentiation code configured to cause the at least one processor to differentiate an input image into a plurality of patches, wherein at least one patch from among the plurality of patches overlaps with at least one other patch from among the plurality of patches, and wherein the overlapping portions of the at least one patch and the at least one other patch consist of portions of the input image;
    inputting code configured to cause the at least one processor to identify whether at least one privacy object is included in the input image by inputting the plurality of patches into a neural network model;
    displaying code configured to cause the at least one processor to display an output image including a guide graphical user interface (GUI) based on identifying whether the at least one privacy object is included in the input image;
    selection code configured to cause the at least one processor to receive selection of a region in the output image through the guide GUI; and image processing code configured to cause the at least one processor to display a modified output image which reflects the selection of the region,
wherein the computer program code further comprises filtering code configured to cause the at least one processor to filter the output image by applying an adversarial noise filter to the output image thereby creating a filtered image.

2. The electronic apparatus of claim 1, wherein the at least one privacy object is at least partially within the selected region.

3. The electronic apparatus of claim 2, wherein the computer program code further comprises:
processing method selection code configured to cause the at least one processor to receive a selection of a method for protecting the at least one privacy object, and
wherein the image processing code is further configured to cause the at least one processor to apply the selected method for protecting the at least one privacy object to the at least one privacy object and to display a processed output image which reflects the application of the selected method for protecting the at least one privacy object.

4. The electronic apparatus of claim 2, wherein the image processing code is further configured to cause the at least one processor to perform at least one of blur processing, single-color processing, or emoji processing on the at least one privacy object.

5. The electronic apparatus of claim 1,
wherein the selection code further includes code configured to cause the at least one processor to identify a region of the display selected by touch input through a stylus pen as a selection region and, based on the at least one privacy object being at least partially within the selection region, to receive selection of the at least one privacy object, and
wherein the image processing code is further configured to cause the at least one processor to apply a method for protecting the selected at least one privacy object to the selected at least one privacy object and to display a processed output image which reflects the application of the selected method for protecting the selected at least one privacy object.

6. The electronic apparatus of claim 1,
wherein the differentiation code further comprises code configured to cause the at least one processor to differentiate a first frame of the input image into a plurality of first patches,
wherein the inputting code further comprises code configured to cause the at least one processor to identify whether the at least one privacy object being included in the first frame by inputting the plurality of first patches into the neural network model, and
wherein the computer program code further includes tracking code configured to cause the at least one processor to identify the at least one privacy object in a second frame of the input image based on the identified at least one privacy object in the first frame.

7. The electronic apparatus of claim 1,
wherein the inputting code further comprises code configured to cause the at least one processor to obtain information on the at least one privacy object included in the input image by inputting the plurality of patches into the neural network model.

8. A method for controlling an electronic apparatus, the method performed by at least one processor and comprising:

differentiating an input image into a plurality of patches, wherein at least one patch from among the plurality of patches overlaps with at least one other patch from among the plurality of patches, and wherein the overlapping portions of the at least one patch and the at least one other patch consist of portions of the input image;

identifying whether at least one privacy object is included in the input image by inputting the plurality of patches into a neural network model;

displaying an output image including a guide graphical user interface (GUI) based on identifying whether the at least one privacy object is included in the input image;

filtering the output image by applying an adversarial noise filter to the output image thereby creating a filtered image;

receiving selection of a region in the output image through the guide GUI; and displaying a modified output image which reflects the selection of the region through the guide GUI.

9. The method of claim 8, wherein the at least one privacy object is at least partially within the selected region, further comprising:

receiving a selection of a method of protecting the at least one privacy object;

processing the at least one privacy object based on applying the selected method of protecting the at least one privacy object to the at least one privacy object based on the selection of the region, through the guide GUI;

displaying a processed output image which reflects the application of the selected method of protecting the at least one privacy object.

10. The method of claim 9, further comprising:

displaying information on a plurality of methods of protecting the at least one privacy object, wherein the received selected method of protecting the at least one privacy object is one of the plurality of methods of protecting the at least one privacy object.

11. The method of claim 9, wherein the selected method of protecting the at least one privacy object is at least one of blur processing, single-color processing, or emoji processing.

12. The method of claim 9, further comprising:

identifying a region of a display selected by touch input through a stylus pen as a selection region and, based on the at least one privacy object being at least partially within the selection region, to receive selection of the at least one privacy object; and processing the selected at least one privacy object based on applying the selected method for protecting the selected at least one privacy object to the selected at least one privacy object.

13. A non-transitory computer readable medium having instructions stored therein, which when executed by a processor cause the processor to execute a method of controlling an electronic apparatus, the method comprising:

differentiating an input image into a plurality of patches, wherein at least one patch from among the plurality of patches overlaps with at least one other patch from among the plurality of patches, and wherein the overlapping portions of the at least one patch and the at least one other patch consist of portions of the input image;

identifying whether at least one privacy object is included in the input image by inputting the plurality of patches into a neural network model;

displaying an output image including a guide graphical user interface (GUI) based on identifying whether the at least one privacy object is included in the input image;

filtering the output image by applying an adversarial noise filter to the output image thereby creating a filtered image;

receiving selection of a region in the output image through the guide GUI; and displaying a modified output image which reflects the selection of the region through the guide GUI.

14. The non-transitory computer readable medium of claim 13, wherein the method further comprises:

receiving a selection of a method of protecting the at least one privacy object;

processing the at least one privacy object based on applying the selected method of protecting the at least one privacy object to the at least one privacy object based on the selection, through the guide GUI, of the region within which the at least one privacy object is located; and displaying a processed output image which reflects the application of the selected method of protecting the at least one privacy object.

15. The non-transitory computer readable medium of claim 14, wherein the method further comprises:

displaying information on a plurality of methods of protecting the at least one privacy object, wherein the received selected method of protecting the at least one privacy object is one of the plurality of methods of protecting the at least one privacy object.

16. The non-transitory computer readable medium of claim 14, wherein the selected method of protecting the at least one privacy object is at least one of blur processing, single-color processing, or emoji processing.

17. The non-transitory computer readable medium of claim 14, the method further comprising:

identifying a region of a display selected by touch input through a stylus pen as a selection region and, based on the at least one privacy object being at least partially within the selection region, to receive selection of the at least one privacy object; and processing the selected at least one privacy object based on applying the selected method for protecting the selected at least one privacy object to the selected at least one privacy object.

* * * * *